(12) United States Patent
Cheng (10) Patent No.: US 11,888,661 B2
(45) Date of Patent: Jan. 30, 2024

(54) DEMODULATING A WIRELESS SIGNAL MODULATED BY PHASE-SHIFT KEYING

(71) Applicant: u-blox AG, Thalwil (CH)

(72) Inventor: Zhenlan Cheng, Thalwil (CH)

(73) Assignee: u-blox AG, Thalwil (CH)

( * ) Notice: Subject to any disclaimer, the term of this patent is extended or adjusted under 35 U.S.C. 154(b) by 125 days.

(21) Appl. No.: 17/457,544

(22) Filed: Dec. 3, 2021

(65) Prior Publication Data

US 2022/0182270 A1 Jun. 9, 2022

(30) Foreign Application Priority Data

Dec. 8, 2020 (EP) .................................... 20212463

(51) Int. Cl.
*H04L 27/233* (2006.01)
*H04L 27/227* (2006.01)

(52) U.S. Cl.
CPC ........ *H04L 27/2338* (2013.01); *H04L 27/227* (2013.01)

(58) Field of Classification Search
CPC ............... H04L 27/2338; H04L 27/227; H04L 27/2271; H04L 27/2272; G01S 19/243; G01S 19/19
USPC ........................................................ 329/304
See application file for complete search history.

(56) References Cited

U.S. PATENT DOCUMENTS

| | | | |
|---|---|---|---|
| 2007/0230543 A1 | 10/2007 | Jia et al. | |
| 2010/0166088 A1* | 7/2010 | Arambepola | ....... H04L 27/2665 375/348 |
| 2014/0072017 A1 | 3/2014 | Gobara | |
| 2019/0223773 A1* | 7/2019 | Galm | ...................... G16H 50/20 |
| 2021/0099329 A1* | 4/2021 | Hellfajer | ............. H04L 27/2657 |

OTHER PUBLICATIONS

Extended European Search Report dated May 28, 2021, for corresponding application No. 20212463.2-1206. (10 pgs).

* cited by examiner

*Primary Examiner* — Richard Tan (74) *Attorney, Agent, or Firm* — FINNEGAN, HENDERSON, FARABOW, GARRETT & DUNNER LLP (57) ABSTRACT

A method and apparatus are provided for demodulating a wireless signal modulated by phase-shift keying. The signal comprises a plurality of symbols. The method includes: obtaining a first sequence of samples based on the signal; converting the first sequence of samples to a first sequence of frequency domain samples; selecting, as a decision variable, the sample that has the maximum magnitude among the first sequence of frequency domain samples; and identifying a symbol or a symbol-transition based on the decision variable.

13 Claims, 6 Drawing Sheets

DEMODULATING A WIRELESS SIGNAL MODULATED BY PHASE-SHIFT KEYING

RELATED APPLICATIONS

The present application claims priority of European Application No. EP20212463.2, filed Dec. 8, 2020, which is incorporated herein by reference.

FIELD OF THE INVENTION

This invention relates to demodulation of wireless signals modulated by phase-shift keying (PSK). It is particularly relevant to the demodulation of signals transmitted in the context of a Global Navigation Satellite System (GNSS).

BACKGROUND OF THE INVENTION

Positioning using Global Navigation Satellite Systems (GNSS), such as the Global Positioning System (GPS) is known. Traditionally, the calculation of position relies on trilateration, based on the time of arrival of signals from multiple different satellites (known as "space vehicles" or SVs). In the case of GPS, for example, satellite signals in the L1 band are conventionally used for trilateration.

The signal transmitted by each SV also includes a navigation message, containing information about the constellation of SVs. For example, the GPS navigation message includes each vehicle's time, clock correction and ephemeris parameters, as well as almanac parameters for all SVs. The information decoded from the navigation message enables the receiver to calculate the positions of several satellites, and thereby calculate its own position relative to the satellites via trilateration.

The GPS navigation message is modulated on the carrier at 50 bps, such that each bit is 20 ms long. This corresponds to 20 cycles of the L1 coarse acquisition ("C/A") spreading code. The L1 C/A code consists of 1023 chips, repeating every 1 ms for a chipping rate of 1.023 Mcps.

The navigation bits are modulated onto the carrier signal with differential encoding, using binary phase-shift keying (BPSK). In other words, each bit-transition (going from 0 to 1, or 1 to 0) in the navigation message is reflected by a 180° phase shift of the carrier signal.

A receiver must demodulate the bits of the navigation message in order to calculate a position fix. However, the frequency and phase of the received signal may be changing continuously. This may make the demodulation task difficult, causing bit-errors. Above a certain error rate, it will not be possible to decode the navigation message successfully.

SUMMARY OF THE INVENTION

It has been recognised that GNSS receivers embedded in wearable devices may face particular challenges in demodulating the bits of the navigation message. In particular, for devices worn on the wrist, it has been observed that rapidly varying Doppler shifts may be induced, as the arm swings backward and forward (for example, during walking, running, etc.) This variable Doppler shift may be sufficient to prevent successful demodulation of navigation bits, using traditional methods.

The invention is defined by the claims. According to a first aspect, there is provided a method of demodulating a wireless signal modulated by phase-shift keying, the signal comprising a plurality of symbols, the method comprising:
obtaining a first sequence of samples based on the signal;
converting the first sequence of samples to a first sequence of frequency domain samples;
selecting, as a decision variable, the sample that has the maximum magnitude among the first sequence of frequency domain samples; and
identifying a symbol or a symbol-transition based on the decision variable.

By converting the sequence of samples to a frequency-domain representation, and detecting the symbol (or symbol-transition) based on the frequency bin with the maximum magnitude, the method can increase robustness to frequency shifts.

The first sequence of samples may represent a whole symbol period or part of a symbol period. The method may be repeated for successive symbols in the signal.

The symbol or symbol-transition may be identified based on a phase of the decision variable.

If the signal uses differential encoding, the method may comprise identifying a symbol-transition, in order to demodulate one or more bits of a data message. If the symbol does not use differential encoding, the method may comprise identifying a symbol, in order to directly demodulate one or more bits of the data message.

The phase shift keying may be binary phase shift keying. In this case, each symbol may comprise one bit.

Identifying the symbol or symbol-transition may comprise comparing the decision variable with a reference variable associated with a preceding symbol-period.

The first sequence of samples may start at the start of a symbol period, the method optionally further comprising: obtaining a second sequence of samples based on the signal, wherein the second sequence of samples ends at the start of said symbol period; reversing the second sequence of samples relative to the first sequence of samples; converting the reversed second sequence of samples to a second sequence of frequency domain samples; and selecting, as a reference variable, the sample that has the maximum magnitude among the second sequence of frequency domain samples, wherein identifying the symbol or the symbol-transition comprises comparing the decision variable with the reference variable.

This approach can be applied generally, irrespective of the type of frequency transform—for example, regardless of whether a DFT or some other frequency transform is used.

In an example with 20 samples per symbol period, and samples numbered 1-40, covering two symbol periods, the "first sequence of samples" may consist of sample numbers 21-40, and the "second sequence of samples" may consist of sample numbers 1-20. The symbol-edge (or "start of the symbol period") is between sample 20 and sample 21.

By converting the second sequence of samples to a frequency-domain representation and choosing the reference variable based on the frequency bin with the maximum magnitude, the method can provide increased robustness to rapid variations in frequency shift, in dynamic environments. For example, the method may be robust to a change in Doppler shift between the first sequence and second sequence.

Each of the first sequence of samples and the second sequence of samples may represent a whole symbol period. Alternatively, each of the first sequence of samples and the second sequence of samples may represent part of a symbol period.

The method may comprise, before comparing the decision variable with the reference variable, delaying, by one symbol period, one of: the second sequence of samples; the reversed second sequence of samples; the second sequence of frequency domain samples; and the reference variable. This provides one way to allow the decision variable from the current symbol period to be compared with the reference variable from the preceding symbol period. Delaying the reference variable, in particular, may have the benefit of reducing the amount of data that needs to be stored. By contrast, delaying a sequence of samples may require more data to be stored.

Converting the first sequence of samples to the first sequence of frequency domain samples may comprise performing a discrete Fourier transform, wherein the first sequence of samples relates to a current symbol period, and wherein identifying the symbol or the symbol-transition comprises comparing the decision variable selected for the current symbol period with a reference variable, wherein the reference variable is a decision variable that was selected for a preceding symbol period.

When the frequency transform is a DFT, the decision variable for the preceding symbol period can conveniently provide a reference variable for the current symbol period. The current symbol period and the preceding symbol period may be consecutive symbol periods.

Identifying the symbol or the symbol-transition may comprise comparing a phase of the decision variable with a phase of the reference variable.

The first sequence of samples and/or second sequence of samples may comprise complex samples output from a correlation operation. The complex samples may be generated by coherent integration.

The correlation operation may be a correlation between the signal and a local replica of a spreading code. In this case, the signal may be a direct sequence spread spectrum signal.

As mentioned above, converting each sequence of samples to a sequence of frequency domain samples may comprise performing a discrete Fourier transform.

The method may further comprise tracking a frequency of the signal using a frequency-locked loop.

The signal may be received from a space vehicle in a global navigation satellite system. The symbols may encode a navigation message from the space vehicle. The method may be used to decode the navigation message.

If the signal is a GPS signal, each sequence of samples may consist of 20 complex samples output from a correlation operation. Each sample may be generated by multiplying a received signal by a local replica of a spreading code, and coherently integrating the results of the multiplication over one repetition of the spreading code. The spreading code may be an L1 C/A code.

The method may be used in a wearable device, in particular a wearable device suitable for wearing on the wrist, such as a smart watch, sport watch, or fitness tracker. In particular, the method may be used in a GNSS receiver of a wearable device.

The present method may be particularly useful in the context of wrist-worn wearable devices. For these devices, the swinging of the wearer's arm can induce a time-varying Doppler shift. The present method can help to negate this time-varying Doppler shift.

Also provided is a demodulator for a wireless signal modulated by phase-shift keying, the signal comprising a plurality of symbols, the demodulator comprising:
  an input, configured to obtain a first sequence of samples based on the signal;
  a first frequency-transform block, configured to convert the first sequence of samples to a first sequence of frequency domain samples;
  a first selection block, configured to select, as a decision variable, the sample that has the maximum magnitude among the first sequence of frequency domain samples; and
  a decision block, configured to identify a symbol or a symbol-transition based on the decision variable.

The decision block may be configured to identify the symbol or symbol-transition based on a phase of the decision variable. The decision block may be configured to compare the decision variable with a reference variable associated with a preceding symbol period.

The first sequence of samples may start at the start of a symbol period, and the input may be configured to obtain a second sequence of samples based on the signal, wherein the second sequence of samples ends at the start of said symbol period, wherein the demodulator further comprises: a reversal block, configured to reverse the second sequence of samples relative to the first sequence of samples; a second frequency-transform block, configured to convert the reversed second sequence of samples to a second sequence of frequency domain samples; and a second selection block, configured to select, as a reference variable, the sample that has the maximum magnitude among the second sequence of frequency domain samples, wherein decision block is configured to identify the symbol or symbol-transition by comparing the decision variable with the reference variable.

Each of the first sequence of samples and the second sequence of samples may represent a whole symbol period. Alternatively, each of the first sequence of samples and the second sequence of samples may represent part of a symbol period.

The decision block may be configured to identify the symbol or the symbol-transition by comparing a phase of the decision variable with a phase of the reference variable.

The input may comprise a buffer, configured to buffer sequences of samples, and provide each buffered sequence of samples to the first frequency-transform block and the reversal block; wherein the demodulator optionally further comprises a delay block; wherein the second selection block is configured to output the reference variable to the delay block; wherein the delay block is configured to delay the reference variable by one symbol period and output the delayed reference variable to the decision block; and wherein the decision block is configured to identify the symbol or the symbol-transition by comparing the decision variable with the delayed reference variable.

The first frequency-transform block may be configured to perform a discrete Fourier transform, wherein the demodulator optionally further comprises a delay block, wherein the first selection block is configured to output the selected decision variable to the delay block, wherein the delay block is configured to delay the decision variable by one symbol period and output the delayed decision variable to the decision block, as a reference variable, and wherein the decision block is configured to identify the symbol or symbol-transition by comparing the decision variable from the current symbol period with the delayed decision variable from the preceding symbol period.

The demodulator may further comprise a correlator configured to generate the first sequence of samples and the second sequence of samples.

The correlator may be configured to generate the complex samples by coherent integration. The correlator may implement a correlation between the signal and a local replica of a spreading code. The signal may be a direct sequence spread spectrum signal.

Each frequency-transform block may be configured to perform a discrete Fourier transform on the respective sequence of samples.

The demodulator may be comprised in a global navigation satellite system receiver. The receiver may be a global positioning system (GPS) receiver.

The demodulator may be comprised in a wearable device.

The demodulator may be comprised in a global navigation satellite system receiver, which may be comprised in a wearable device. As summarised above, the wearable device may be a fitness tracker or smart watch, for example.

Also provided is a computer program comprising computer program code configured to cause at least one physical computing device to carry out all the steps of a method as summarise above, when said computer program is executed by said at least one physical computing device.

The computer program may be embodied on a computer readable medium, optionally a non-transitory computer readable medium. The at least one physical computing device may be a processor of a wireless communication device.

BRIEF DESCRIPTION OF THE DRAWINGS

The invention will now be described by way of example with reference to the accompanying drawings, in which.

DETAILED DESCRIPTION

Exemplary embodiments will now be described in the context of a GNSS receiver—in particular, a GPS receiver. However, it will be understood that this example is non-limiting.

Figure 1:
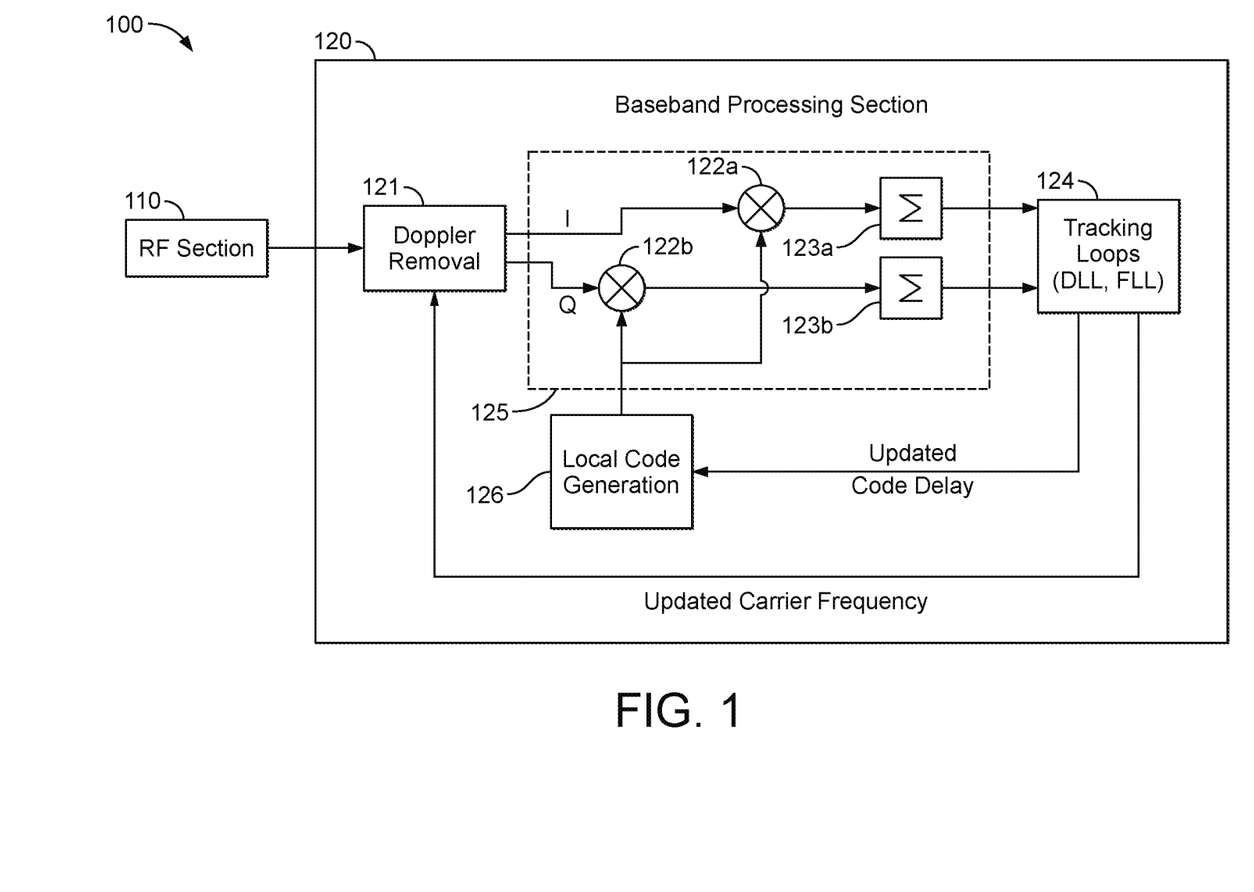
FIG. 1 is block diagram illustrating part of a GPS receiver.

FIG. 1 is a simplified block diagram illustrating part of a GPS receiver 100. As illustrated, the GPS receiver 100 comprises a radio frequency (RF) section 110 and a baseband processing section 120. The RF section includes an antenna and an RF front-end (not shown). These may be of any suitable kind, including those known in the art. The output of the RF front-end, and therefore of the RF section 110, is a stream of digital samples of SV signals received via the antenna and down-converted by the RF front end. The baseband processing section 120 performs digital signal processing on the stream of digital samples.

The baseband processing section 120 comprises a Doppler removal block 121; tracking loops 124; a correlator 125; and a local code generation block 126. The correlator 125 comprises a pair of multipliers 122a, 122b and a pair of accumulators 123a, 123b (also known as "integrate-and-dump" blocks). The tracking loops include a delay-locked loop (DLL) and a frequency-locked loop (FLL). The DLL tracks the code-phase delay of the spreading code of the SV signal. The FLL tracks the currently observed carrier frequency of the SV signal. The baseband processing section 120 shown in FIG. 1 processes one "channel"—that is, it is responsible for acquiring and tracking a given signal from a given SV. Other baseband processing sections (not shown) are typically provided to process the signals of other SVs.

The Doppler removal block 121 is responsible for compensating for the observed Doppler shift in the carrier frequency of the SV signal. This Doppler shift includes a component caused by the motion of the SV, and may also include components caused by motion of the GPS receiver. The Doppler removal block 121 uses an estimate of the currently observed carrier frequency, provided by the tracking loops 124.

The local code generation block 126 generates a local replica of the spreading code (pseudorandom noise code) associated with the SV. The local replica code is generated based on the current estimate of the code delay and Doppler frequency, provided by the tracking loops 124.

The correlator 125 correlates the local replica code with the in-phase (I) and quadrature (Q) components of the incoming signals, after Doppler removal by the Doppler removal block 121. At multiplier 122a, in-phase samples are multiplied by the local replica code. The results of this product calculation are accumulated (that is, summed) in the accumulator 123a. Similarly, quadrature samples are multiplied by the local replica code at multiplier 122b and the results are summed in the accumulator 123b. As will be understood, correlations of the local replica code with the received SV signals are one of the core operations of a GPS receiver, in order to allow a pseudo-range to the SV to be calculated.

The outputs of the correlator 125 remain modulated by the navigation message. The bits of the navigation message are modulated (by the SV) onto the signal using BPSK modulation. For the GPS L1 signal, each navigation bit corresponds to 20 repetitions of the spreading code; therefore, there are 20 complex-valued correlator outputs to consider, in order to demodulate each navigation bit. Conventionally, these 20 correlator outputs would be integrated to produce a decision variable for identifying (that is, detecting) a navigation bit. Since the signal is tracked by the FLL, there is no constant reference phase for BPSK bit detection. Instead, the system detects bits in a differential way—using the phase of the preceding bit as a reference to detect the relative phase of the current bit. In a conventional GPS receiver, the decision variable for the preceding bit usually provides the reference variable for the next bit. If two consecutive bits are the same (11 or 00), then no phase change is expected between the decision variable and the reference variable. On the other hand, if the two consecutive bits are different (10 or 01), there should be a phase shift of 180° between the reference variable and the decision variable.

Noise and other variations will tend to interfere with the demodulation of the BPSK signal, which may cause errors in the detected bits of the navigation message. In particular, errors in the current estimate of the carrier frequency will mean that an arbitrary phase-rotation is introduced into the complex samples output by the correlator 125. It has been found that this problem is particularly challenging for rapid variations in Doppler, observed in highly dynamic scenarios. One example of such a scenario arises with a wrist-worn GPS receiver, such as a smart watch. When the wearer is running, the user's arm may swing rapidly over a wide arc. Depending on the gait of the user and the current position of the SV in the sky, the receiver may accelerate towards and then away from the SV, repeatedly.

Conventionally, a phase-locked loop (PLL) was provided as one of the tracking loops. Its task was to track the carrier phase precisely and thereby—ideally—avoid errors in the estimated carrier frequency. This was meant to ensure correct Doppler removal, to avoid bit-detection errors. However, it has been found that the PLL is susceptible to the rapidly-changing Doppler shift caused by arm-swinging. The PLL tends to lose phase lock and the FLL tracks the average Doppler frequency over the loop-update period (instead of the instantaneous Doppler frequency). This can prove insufficient for correct bit detection, in the arm-swinging case.

In the following embodiments, a different strategy is applied to demodulate the navigation bits, in an effort to be more robust—in particular—to rapidly changing Doppler shifts in highly dynamic scenarios, such as arm-swinging when running. Instead of simply integrating the complex correlator outputs in the time domain, they are transformed to the frequency domain. A decision variable and reference variable are formed and compared in the frequency domain. By selecting the decision variable and reference variable appropriately, this approach can help to mitigate the effects of instantaneous Doppler shift.

Figure 2:
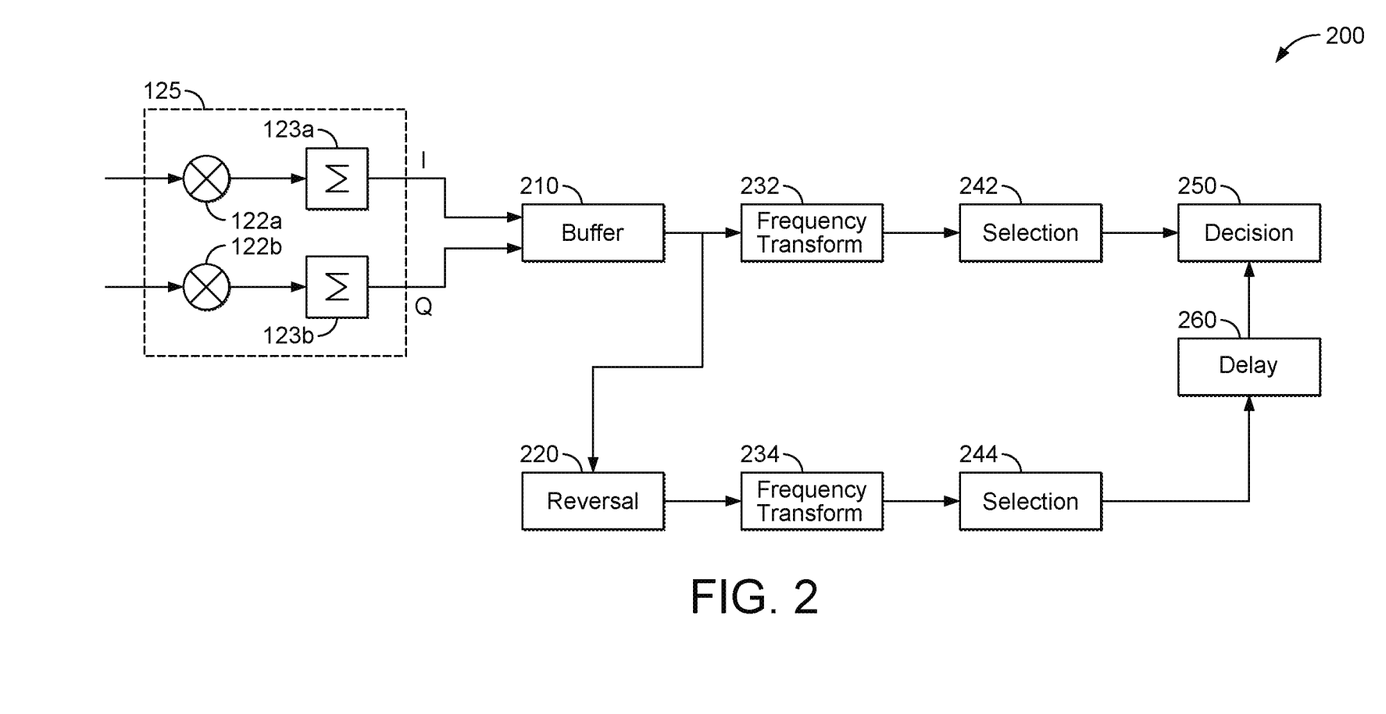
FIG. 2 is a block diagram of a demodulator according to an embodiment.
Figure 3:
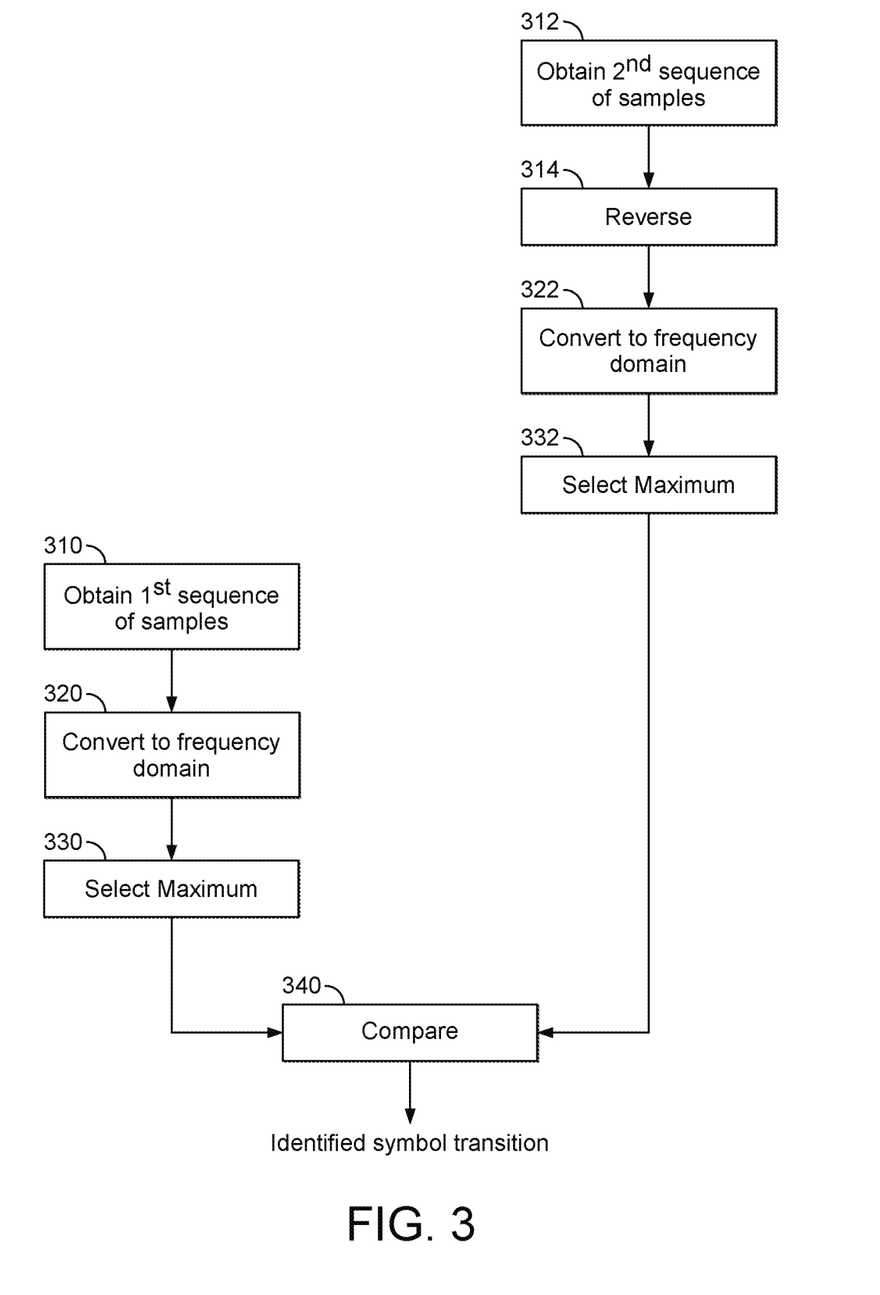
FIG. 3 is a flowchart illustrating a method of demodulating navigation bits of a GPS signal, according to an embodiment.

FIG. 2 is a block diagram of a demodulator 200 according to an embodiment. FIG. 3 is a flowchart of a method performed by the demodulator 200. According to the present example, the demodulator comprises the correlator 125; a buffer 210; a reversal block 220; a first frequency-transform block 232; a second frequency-transform block 234; a first selection block 242; a second selection block 244; a decision block 250; and a delay block 260.

As described already above, the correlator 125 outputs a series of complex samples—one sample per repetition of the spreading code; therefore, 20 samples per navigation bit, in the present example. In other words, one complex sample is output per millisecond. These complex samples are output to the buffer 210. The buffer 210 buffers the sequence of 20 samples for each navigation bit. For each navigation bit, the buffer 210 outputs the buffered sequence of samples to the first frequency-transform block 232 and the reversal block 220.

The first frequency-transform block 232 is configured to perform a frequency transform, to convert the sequence of samples to a first sequence of frequency domain samples. The reversal block 220 is configured to reverse the order of the sequence of samples. That is, the reversal block 220 outputs a reversed sequence of samples, in which the first sample becomes the last sample, and the last sample becomes the first sample, and so forth. The reversed sequence of samples is output by the reversal block 220 to the second frequency-transform block 234. This is configured to perform a frequency transform, to convert the reversed sequence of samples to a second sequence of frequency domain samples. As a result of the operation of the reversal block 220, the frequency transform performed by the second frequency-transform block 234 is effectively referenced to the phase of the last sample in the buffered sequence of samples, whereas the frequency transform performed by the first frequency-transform block 232 is referenced to the first sample in the buffered sequence of samples. Blocks 232 and 234 perform the same frequency transform. In general, any kind of frequency transform may be used. Suitable frequency transforms include, but are not limited to, a discrete Fourier transform (DFT) or a fast Fourier transform (FFT). As an alternative to one of these Fourier transforms, the frequency transform block may implement a matched filter-bank. The use of a matched filter-bank may lead to greater flexibility in selecting the number and range of frequency bins that are computed. For example, using a matched filter-bank, the number of frequency domain samples need not be equal to the number of time domain samples.

The first selection block 242 is configured to select the frequency domain sample having the greatest magnitude (among the first sequence of frequency domain samples) as the decision variable for bit identification (that is, bit detection). In particular, the phase of this frequency domain sample will form the decision variable. The first selection block 242 is configured to output the decision variable to the decision block 250.

The second selection block 244 is configured to select the frequency domain sample having the greatest magnitude (among the second sequence of frequency domain samples) as the reference variable for bit identification. Specifically, the phase of this frequency domain sample will form the reference variable. The second selection block 244 is configured to output the reference variable to the delay block 260.

The delay block 260 is configured to delay the reference variable by one bit period, and to output the delayed reference variable to the decision block 250. This delay means that the decision variable derived from the current bit is compared with the reference variable derived from the previous bit, in the decision block 250.

The decision block 250 is configured to identify (that is, detect) the bit-transition by comparing the decision variable, produced by the first selection block 242, with the delayed reference variable, produced by the second selection block 244. In particular, the decision block 250 is configured to calculate a phase difference between the decision variable and reference variable, and to detect the bit-transition according to the phase difference. For example, if the absolute difference in phase is less than 90°, the decision block 250 would decide that the bit-transition was between two identical bits (that is, the bit-sequence was 11 or 00). Conversely, if the absolute difference in phase is greater than 90°, the decision block 250 would decide that there had been a bit transition between two different bits (that is, the bit-sequence was 10 or 01).

The purpose of the reversal block 220 is to ensure that the first sequence of frequency domain samples and the second sequence of frequency domain samples are aligned to a common phase reference. By reversing the sequence of samples that forms the basis for the reference variable (and then delaying the reference variable, at the delay block 260), the common phase reference will be the phase at the boundary between the pair of consecutive bits.

The method performed by the demodulator 200 will now be described in greater detail, with reference to FIG. 3. In step 310, the buffer 210 obtains a first sequence of complex samples from the correlator 125. These samples correspond to a current navigation bit. In step 320, the first frequency-transform block 232 converts the first sequence of samples to a first sequence of frequency domain samples. In step 330, the first selection block 242 selects the frequency domain sample having the largest magnitude to form the decision variable. The bit-transition between the previous navigation bit and the current navigation bit will be detected based on this decision variable.

Previously, the demodulator will already have received and processed a second sequence of complex samples, corresponding to the previous navigation bit. This earlier processing is represented by steps 312, 314, 322 and 332 of the method. In step 312, the buffer 210 obtains the second sequence of complex samples from the correlator 125. In step 314, the reversal block 220 reverses the second sequence of samples relative to the first sequence of samples. In step 322, the second frequency-transform block 234 converts the reversed second sequence of samples to a second sequence of frequency domain samples. In step 332, the second selection block 244 selects the frequency domain sample having the largest magnitude (among the second sequence of frequency domain samples) to form the reference variable. The reference variable is delayed by one bit-period in the delay block 260, so that the delayed reference variable for the previous bit is compared with the decision variable for the current bit, in the decision block 250. This comparison is indicated by step 340 in FIG. 3. The comparison determines whether there was no bit-change (and therefore no phase shift imposed on the carrier, at the transmitter) between the bit-periods, or a bit-change occurred (and therefore a 180° phase shift was imposed, at the transmitter) between the bit-periods. The output of the method is the identified bit-transition.

Selecting the decision variable and reference variable based on the frequency bins (that is, frequency samples) with the biggest magnitude means that the instantaneous Doppler frequency is implicitly wiped off from these variables. Note that, in this method, the reference variable for the previous bit is determined independently of the decision variable for the current bit. This means that the reference variable may come from a different frequency bin, compared with the frequency bin that provides the decision variable. This can enable the method to be more robust to changes in Doppler frequency between the two bits.

Figure 4A:
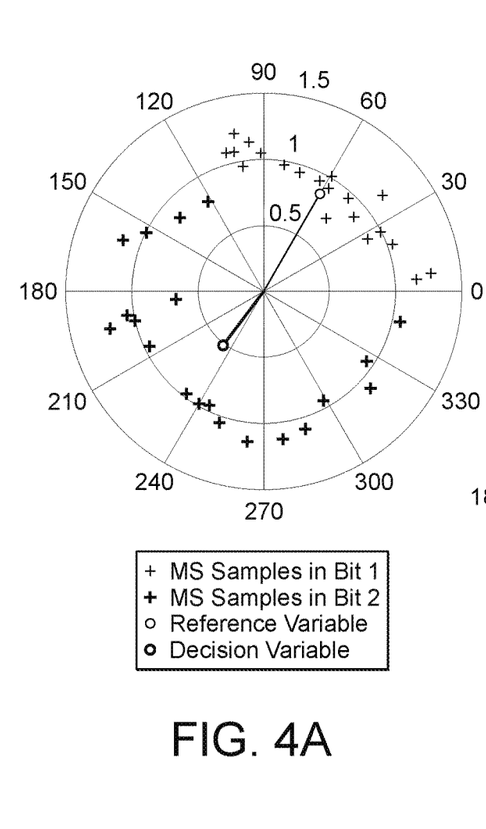
FIG. 4A is a polar plot showing complex outputs of a correlator in a GPS receiver, illustrating a decision variable and reference variable formed by integration over a symbol-period, for consecutive symbols that are identical.
Figure 4B:
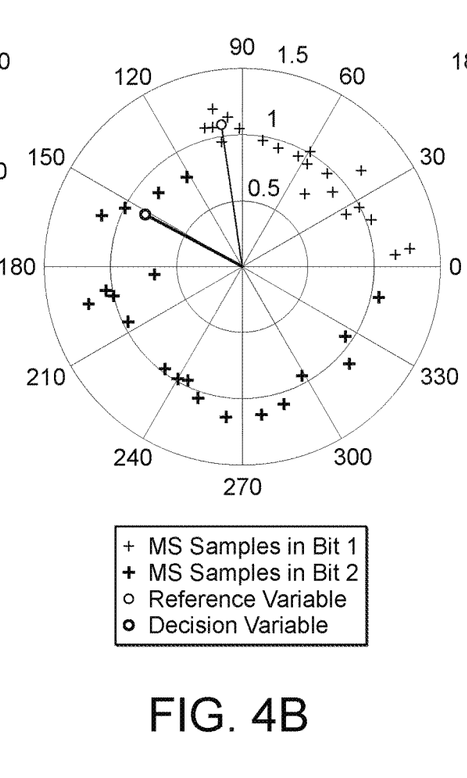
FIG. 4B is a polar plot similar to FIG. 4A, but illustrating a decision variable and reference variable formed by integration over a shorter interval.
Figure 4C:
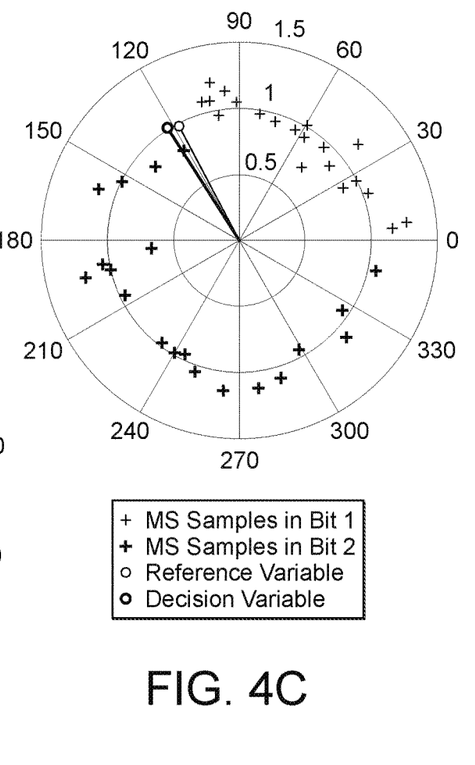
FIG. 4C is a polar plot similar to FIG. 4A, but illustrating a decision variable and reference variable that are formed by a method according to an embodiment.

The benefits of this can be seen in FIGS. 4 and 5. FIGS. 4A-C show exemplary first and second sequences of complex samples. The same sequences are shown in each plot. In this example, the two consecutive bits are the same; therefore, at the transmitter, there was no phase shift between the respective bit-periods. The frequency error observed at the receiver, during the two bit-periods, was 16 Hz and 31 Hz, respectively. The reference variable and decision variable are selected differently in each plot. FIG. 4A shows a conventional choice of decision variable, formed by coherent integration of all 20 samples of the first sequence (for the current bit). Likewise, it illustrates a conventional choice of reference variable, formed by coherent integration of all 20 samples of the second sequence (for the previous bit). As can be seen in the plot, the effect of varying Doppler shift has caused the decision and reference variable to be almost 180° out of phase, despite the fact that there was no phase shift at the transmitter. In other words, this scenario will lead to an error in identifying the bit-transition. FIG. 4B illustrates a decision variable and reference variable based on coherent integration over a shorter time interval—in particular, over just 5 of the 20 samples (5 ms). In this case, the decision and reference variables are closer in phase and there would be no error in detecting the bit-transition. Nevertheless, there is still a significant phase rotation between the decision and reference variables. (The ideal case would be that there is no phase difference between the decision and reference variables.) Additionally, reducing the integration period in this way incurs a 6 dB penalty in signal-to-noise ratio (SNR). FIG. 4C illustrates the decision and reference variable chosen according to the method of the embodiment described above. By constructing the reference variable and decision variable independently of one another, based on the respective maximum-magnitude frequency domain samples, it can be seen that the phase shift between them is minimal. This gives more reliable detection of the bit-transition.

Figure 5A:
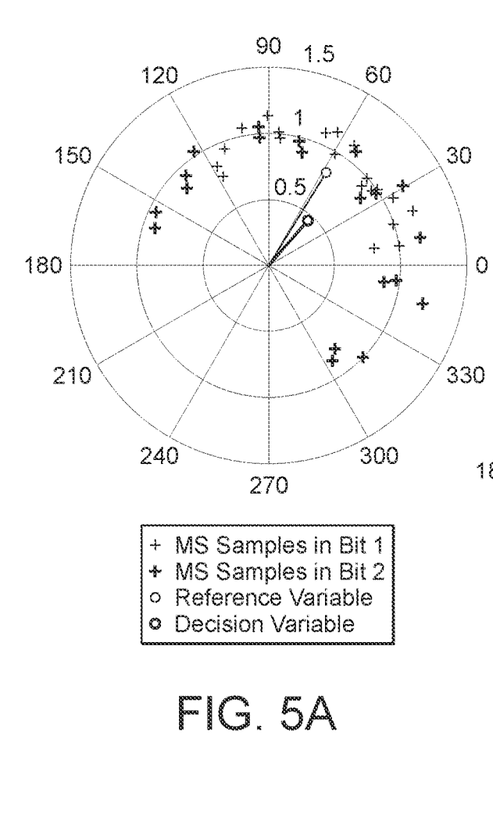
FIGS. 5A-C are polar plots like those of FIGS. 4A-C, for consecutive symbols that are different.
Figure 5B:
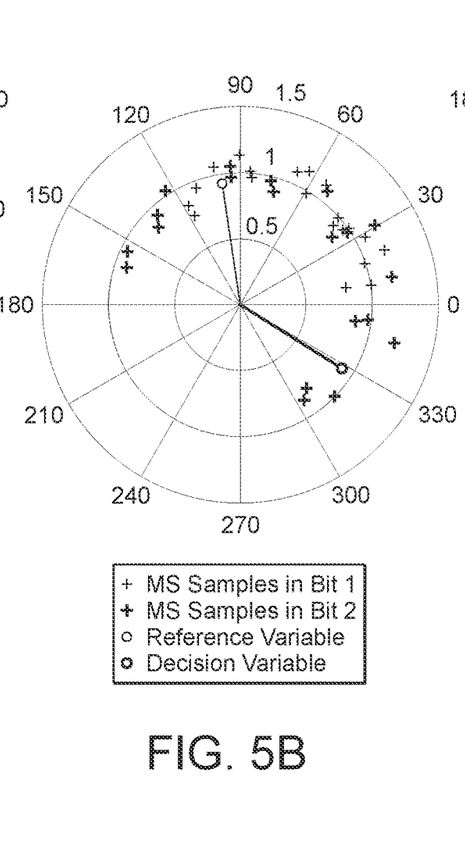
Figure 5C:
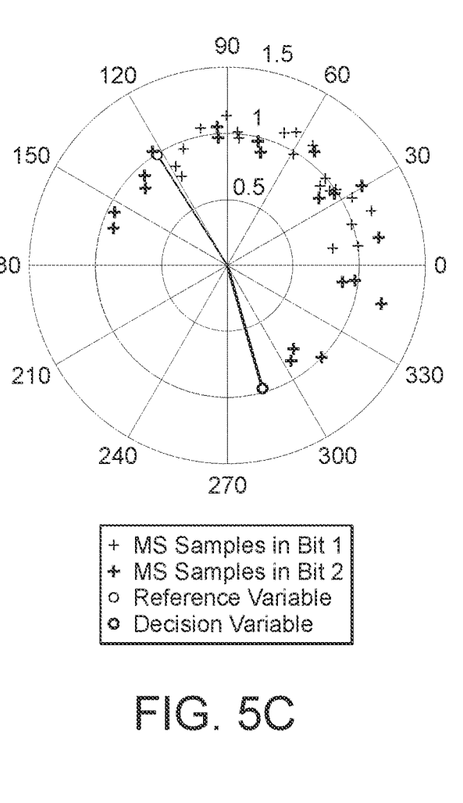

FIGS. 5A-C show another real-world example. In this case, the two consecutive bits are different; therefore, a phase shift of 180° is expected between the reference variable and decision variable. FIG. 5A shows that conventional integration with a 20 ms integration period leads to a detection error, because the phases of the two variables are almost perfectly aligned (that is, the phase difference is close to 0°). The situation is improved by reducing the integration period to 5 ms (FIG. 5B). In this case, the phase difference between the variables increases, such that the bit-transition would be detected correctly. However, there is still a significant deviation from the ideal result, which should exhibit a phase shift of 180°; and the SNR also drops by 6 dB, as mentioned before. FIG. 5C, which uses the method described above, is closer to this ideal result. FIGS. 4C and 5C show the best separation between the two cases—that is, the case of two consecutive bits (FIG. 4C) and the case of two different bits (FIG. 5C). This suggests that the method of the embodiment described above will be more robust against the effects of variable Doppler shift, compared with the other methods analysed. This is borne out by more extensive experiments. The method according to the present example was able to improve the decoding success rate of GPS L1 C/A sub-frames by 36%. It was able to improve that of GLONASS L1OF by 46%.

The method can also enable reduced reliance on the tracking loops. Indeed, in some embodiments, it may avoid the need for a PLL. It can be sufficient that the FLL tracks the average carrier frequency, with the combined effect of the frequency-transform blocks 232 and 234, and selection blocks 242 and 244, taking care of any remaining Doppler variations.

Figure 6:
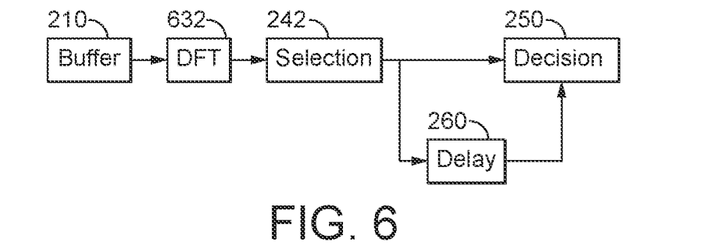
FIG. 6 is a block diagram of a demodulator according to another embodiment.
Figure 7:
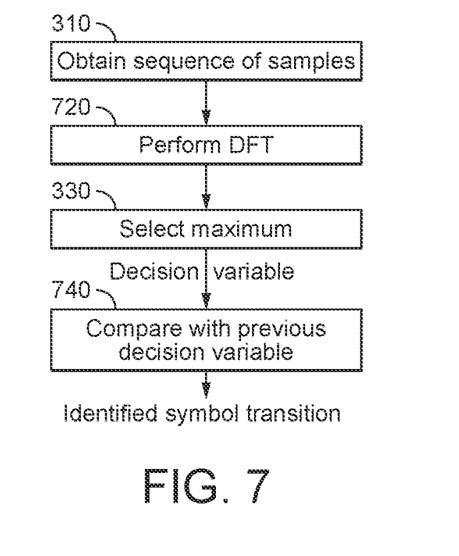
FIG. 7 is a flowchart illustrating a method of demodulating navigation bits, suitable for the demodulator of FIG. 6.

A simplification is possible in the special case in which the frequency transform is a discrete Fourier transform (DFT). FIG. 6 is a block diagram illustrating a simplified demodulator according to such an embodiment. Here, DFT block 632 replaces the first frequency transform block 232 of FIG. 2. FIG. 7 is a flowchart illustrating a method performed by the demodulator of FIG. 6. Here, likewise, the step 720 of performing a DFT is a special case of the general step 320 of converting to frequency domain samples. Blocks and steps that are the same as their counterparts in the embodiment of FIGS. 2-3 are given the same reference numerals.

The DFT is a specific frequency transform with particular properties. One of these is the property that reversal of the sequence of samples in the time domain results in a reversal of the sequence of frequency domain samples. This property can be exploited to eliminate some of the blocks in FIG. 2 (and some of the steps in FIG. 3), when using the DFT as the frequency transform. In fact, it can be shown that—when using the DFT—the reference variable selected by the second selection block 244 is always the same as the decision variable that was selected by the first selection block 242 for the preceding symbol-period. This means that the reversal block 220, second frequency-transform block 234, and second selection block 244 are redundant and can be eliminated. Instead, the output of the first selection block 242 is coupled to the input of the delay block 260 (as well as to the input of the decision block 250). Consequently, in each symbol-period, the decision block 250 identifies the current symbol (or current symbol-transition) by comparing the decision variable for the current symbol-period with a reference variable consisting of the delayed decision variable for the immediately preceding symbol period. This comparison is indicated by step 740 in FIG. 7.

As will be apparent from the foregoing explanation, the method and demodulator of the present example are well-suited for use in a GPS receiver implemented in a wearable device—especially a wrist-worn wearable device.

It should be noted that the above-mentioned embodiments illustrate rather than limit the invention, and that those skilled in the art will be able to design many alternative embodiments without departing from the scope of the appended claims.

For instance, embodiments may be used in GNSS receivers other than GPS receivers. More generally, embodiments may find utility in any receiver that demodulates a signal that has been modulated by phase shift keying.

In the embodiment of FIG. 2, the identification (that is, detection) of the bit-transition is based on both the decision variable and the reference variable. It is possible that in some other implementations, the detection is based solely on the decision variable, without needing the reference variable to provide a relative reference phase—for example, using coherent detection with a PLL.

In the embodiment of FIG. 2, the first and second sequences of samples each represented an entire bit-period (symbol-period). In other embodiments, it is possible that each sequence of frequency domain samples may be calculated from a sequence of samples lasting less than one entire bit-/symbol-period. For example, the frequency transform blocks might operate on the first half of the sequence of samples for the current symbol, and the second half of the sequence of samples for the previous symbol. Again, in this case, the boundary between symbols serves as a common phase reference for the two frequency-transforms.

For the avoidance of doubt, the method assumes that the timing of the bit-edge (that is, the boundary between symbols) is known. It will be understood that after successful acquisition of the SV signal, and bit synchronization, a GNSS receiver will know this timing. Alignment with the bit-edge will be maintained over time, by the tracking loops.

Similarly, in other embodiments, instead of detecting bit-transitions, the demodulation of the signal may conclude with detecting bits. Whether bits or bit-transitions are detected may depend on the coding scheme used when modulating the signal at the transmitter of the SV.

In the case of GPS signals—and other GNSS signals—the navigation message is modulated onto the carrier using BPSK. Thus, there is one bit per symbol. It should be understood that the method can also be applied in other communication schemes, employing more than one bit per symbol. For example, it could be applied to Quadrature Phase Shift Keying (QPSK) which carries two bits per symbol. In this case, the statements above about bit-transitions and bit-periods will apply more generally to the symbol-transitions and symbol-periods of the modulated signal.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may reflect a preferred sequence of operations.

In the present implementation of the exemplary embodiment of FIG. 2, the frequency-transform blocks are implemented in dedicated hardware and the other blocks are implemented in software running on a digital signal processor. This allows the relatively computationally-intensive frequency-transform operations to be performed efficiently, without exhausting the processing capacity of the digital signal processor.

In general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it should be understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of demodulating a wireless signal modulated by phase-shift keying, the wireless signal comprising a plurality of symbols, the method comprising:
    obtaining a first sequence of samples based on the wireless signal;
    converting the first sequence of samples to a first sequence of frequency domain samples;
    selecting, as a decision variable, a sample that has a maximum magnitude among the first sequence of the frequency domain samples; and
    identifying a symbol or a symbol-transition based on the decision variable,
    wherein the first sequence of samples starts at a start of a symbol period, and the method further comprises:
    obtaining a second sequence of samples based on the wireless signal, wherein the second sequence of samples ends at the start of the symbol period;
    reversing the second sequence of samples relative to the first sequence of samples;
    converting the reversed second sequence of samples to a second sequence of frequency domain samples; and
    selecting, as a reference variable, a sample that has a maximum magnitude among the second sequence of frequency domain samples,
    wherein the identifying the symbol or the symbol-transition comprises comparing the decision variable with the reference variable.

2. The method of claim 1, wherein the converting the first sequence of samples to the first sequence of frequency domain samples comprises performing a discrete Fourier transform,
    wherein the first sequence of samples relates to a current symbol period,
    and wherein the identifying the symbol or the symbol-transition comprises comparing the decision variable selected for the current symbol period with a reference variable, wherein the reference variable is a decision variable that was selected for a preceding symbol period.

3. The method of claim 1, wherein the identifying the symbol or the symbol-transition comprises comparing a phase of the decision variable with a phase of the reference variable.

4. The method of claim 1, wherein at least one of the first sequence of samples or the second sequence of samples comprise complex samples output from a correlation operation.

5. The method of claim 4, wherein the correlation operation is a correlation between the wireless signal and a local replica of a spreading code.

6. The method of claim 1, further comprising tracking a frequency of the wireless signal using a frequency-locked loop.

7. The method of claim 1, wherein the wireless signal is received from a space vehicle in a global navigation satellite system.

8. A computer program comprising computer program code configured to cause at least one physical computing device to carry out all the steps of the method of claim 1 if said computer program is executed by said at least one physical computing device.

9. A demodulator for a wireless signal modulated by phase-shift keying, the wireless signal comprising a plurality of symbols, the demodulator comprising:
    an input, configured to obtain a first sequence of samples based on the wireless signal;
    a first frequency-transform block, configured to convert the first sequence of samples to a first sequence of frequency domain samples;
    a first selection block, configured to select, as a decision variable, a sample that has a maximum magnitude among the first sequence of frequency domain samples; and
    a decision block, configured to identify a symbol or a symbol-transition based on the decision variable,
    wherein the first sequence of samples starts at a start of a symbol period, and
    the input is configured to obtain a second sequence of samples based on the wireless signal, wherein the second sequence of samples ends at the start of the symbol period,
    wherein the demodulator further comprises:
    a reversal block, configured to reverse the second sequence of samples relative to the first sequence of samples;
    a second frequency-transform block, configured to convert the reversed second sequence of samples to a second sequence of frequency domain samples; and
    a second selection block, configured to select, as a reference variable, a sample that has a maximum magnitude among the second sequence of frequency domain samples, and
    wherein the decision block is configured to identify the symbol or symbol-transition by comparing the decision variable with the reference variable.

10. The demodulator of claim 9, wherein the input comprises a buffer, configured to buffer sequences of samples, and provide each of the buffered sequences of samples to the first frequency-transform block and the reversal block;
    wherein the demodulator further comprises a delay block;
    wherein the second selection block is configured to output the reference variable to the delay block;
    wherein the delay block is configured to delay the reference variable by one symbol period and output the delayed reference variable to the decision block; and
    wherein the decision block is configured to identify the symbol or the symbol-transition by comparing the decision variable with the delayed reference variable.

11. The demodulator of claim 9, wherein the first frequency-transform block is configured to perform a discrete Fourier transform,
    wherein the demodulator further comprises a delay block,
    wherein the first selection block is configured to output the selected decision variable to the delay block,
    wherein the delay block is configured to delay the decision variable by one symbol period and output the delayed decision variable to the decision block as a reference variable, and
    wherein the decision block is configured to identify the symbol or symbol-transition by comparing the decision variable from a current symbol period with the delayed decision variable from a preceding symbol period.

12. The demodulator of claim 9, comprised in a global navigation satellite system receiver.

13. The demodulator of claim 9, wherein the demodulator is comprised in a wearable device.

* * * * *